Dec. 3, 1968     B. LONG     3,414,454
FLAT GLASS SHEET AND METHOD AND APPARATUS FOR MAKING SHEET
Filed Oct. 28, 1964     2 Sheets-Sheet 1
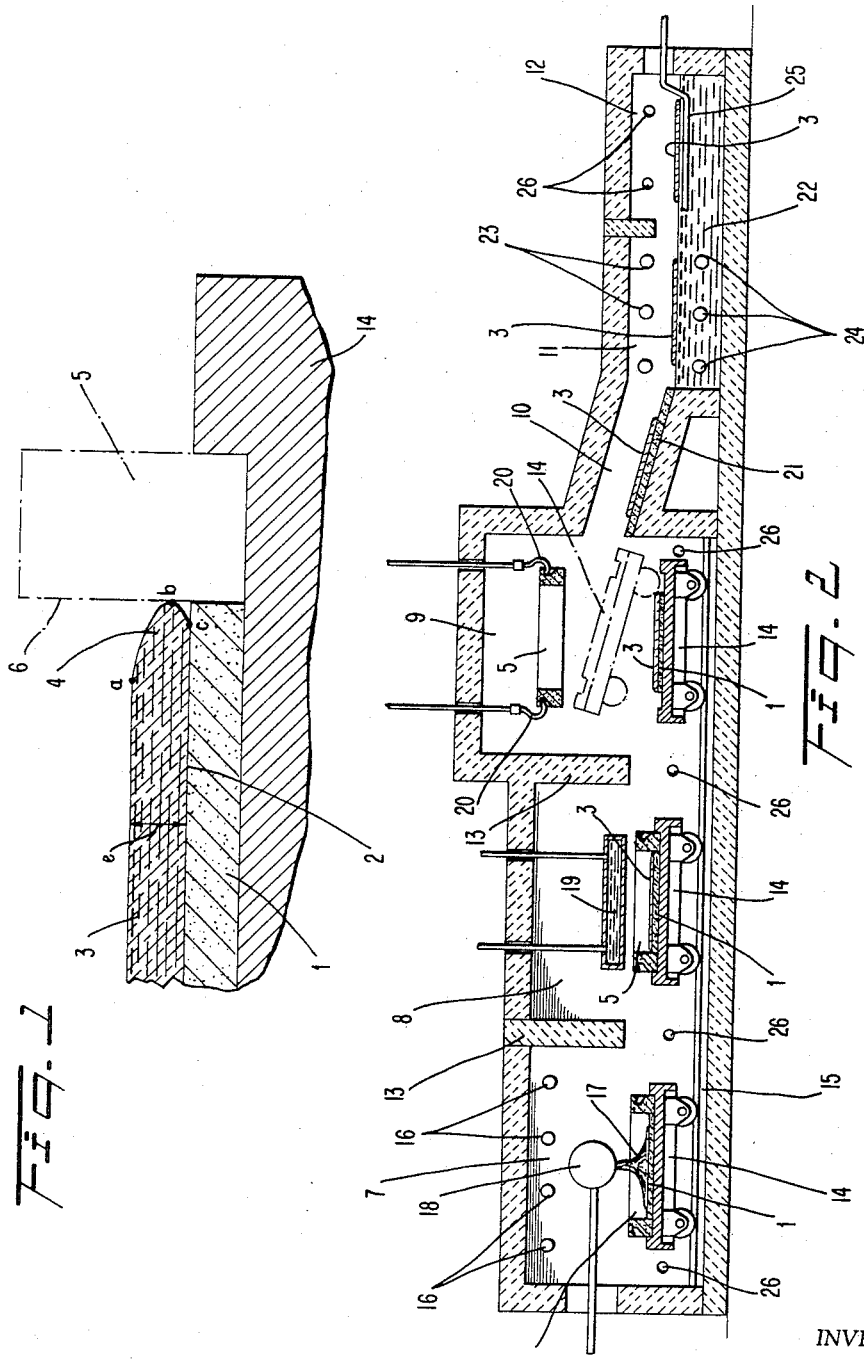
INVENTOR.
BERNARD LONG
BY Bauer and Seymour
ATTORNEYS

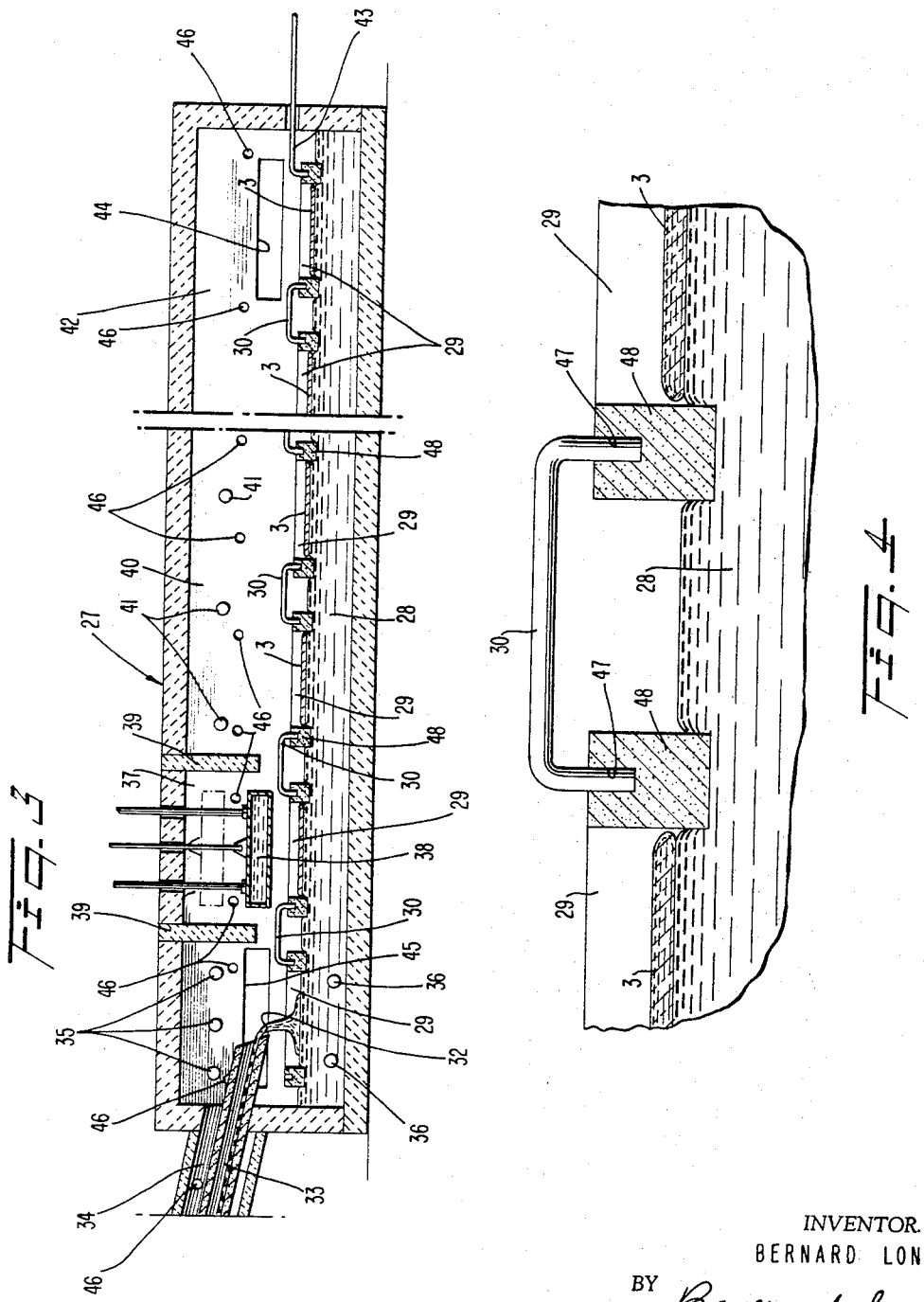

3,414,454
FLAT GLASS SHEET AND METHOD AND
APPARATUS FOR MAKING SHEET
Bernard Long, 63 Rue de Rome, Paris 8eme, France
Filed Oct. 28, 1964, Ser. No. 407,023
Claims priority, application France, Nov. 7, 1963,
952,993
24 Claims. (Cl. 161—1)

The present invention relates to glass sheets, the faces of which have the so-called "fire-polished" aspect, and an excellent surface flatness, as well as rounded and polished edges.

Such glass sheets are used for automobile windows and are also used as mirrors once a reflective deposit, such as silver plating, has been laid on one face.

At the present time, said glass sheets are cut out from continuous ribbons of glass, the faces of which have good "fire polish" and have an excellent surface flatness, the rough-cut edges thereof being afterwards rounded by grinding and later polished mechanically. The cost of cutting out said glass sheets is not negligible, but is small in comparison with the cost of edge grinding and polishing. In the case of glass sheets of a relatively small surface, such as windows for automobiles, these costs are an important fraction of the total cost.

The present invention has for its object a process for producing, at a lower cost than by present known techniques, glass sheets of given sizes and shapes, the faces of which present a good "fire polish" and an excellent surface flatness, the edges of which are rounded and polished, the said lower cost resulting from the elimination of the cutting operations as well as of the grinding and mechanical polishing of the edges.

The present process includes the steps of:

(1) Introducing a certain quantity of molten glass on the flat and horizontal bottom of a heated mold, made of a material which is not wetted by molten glass, in a non-oxidizing atmosphere; the volume of molten glass so introduced is measured so that it is not inferior to the volume of a sheet of glass which has been poured and allowed to spread over the whole bottom surface of the mold without making edge contact with the mold wall, under the same conditions of temperature and in the same nonoxidizing atmosphere;

(2) Letting the volume of molten glass so introduced in the mold spread out by the combined action of gravity and surface tension, so as to produce a layer of uniform thickness, the rounded edges of which are in contact with the inner surface of the mold sidewalls, which are also made of a material not wetted by liquid glass;

(3) Very quickly cooling the layer of glass of uniform thickness thus formed on the horizontal inner contour of the mold, to a temperature such that the original volume of molten glass becomes a still "plastic" sheet of glass;

(4) Withdrawing this "plastic" sheet from the mold and placing it on the surface of a molten metal bath over which a nonoxidizing atmosphere is maintained;

(5) Maintaining the glass sheet in a "plastic" condition during the time required to eliminate all surface defects from its faces;

(6) Gradually cooling the sheet and then transferring and annealing it in an annealing oven without damaging its faces.

The above mentioned process comprises two essential operations:

(a) On the one hand, the molding of a sufficient volume of glass in the form of a sheet of given dimensions and shape, with rounded edges, by the combined action of gravity and surface tension;

(b) On the other hand, the leveling out of the surface and/or flatness defects of the faces of the molded sheet, particularly on its underface, by maintaining said glass sheet in a "plastic" condition on the surface of a molten metal bath.

An alternate method of the abovementioned process will hereinafter be discussed, wherein the transfer of the glass sheet in a "plastic" condition from the mold to the surface of molten metal, and the leveling out of the surface and/or flatness defects of the faces are eliminated, the above simplification being obtained by using the surface of the molten metal bath itself as a mold bottom.

It has been found that a volume of liquid molten glass poured over a surface which is not wetted by it, spreads down by itself (without any lateral contact) to an "equilibrium" thickness of about 6 millimeters through the combined action of gravity and surface tension, when the surface tension is about 350 dynes/centimeter and when the density of the glass used is about 2.5.

When, with the same density, the surface tension is lowered to 300 dynes/centimeter, the new "equilibrium" thickness is about 5.5 millimeters.

It should be noted that said "equilibrium" thickness varies very little in relation to temperature as long as said temperature is maintained between 1000° C. and 1300° C.

If $e$ represents the "equilibrium" thickness, and $S$ represents the area of the mold bottom, the volume of glass to be introduced into the mold to obtain, after spreading, a layer of uniform thickness having the same contour as said mold, should not be less than $S \times e$, the small volume defined between the rounded surface of the edges of said layer and the inner surface of the mold sidewalls being practically negligible.

A better understanding of the above can be obtained from FIG. 1 of the annexed drawings which shows a vertical cross section of the edge area 4 of layer 3 formed by the freely spreading volume of molten glass on the non-wettable flat horizotnal surface 2 of the mold bottom 1 upon which it has been poured.

The "equilibrium" thickness of said layer is called $e$, the rounded edge being represented by the curved surface $a, b, c$.

It is obvious that the volume defined by the rounded edge and the vertical plane comprising $b$ is small comparatively to the volume of the glass sheet.

In the case where the edge area is in contact with the inner surface 6 of a sidewall 5 (shown by a dotted line), the edge area 4 is more or less flattened (not shown) in the vicinity of $b$, since the glass then blends into the sidewalls at a certain angle, but the resulting change of shape of the edge area is practically negligible.

It should be noted that the dimensions of the hot molded layer, and the dimensions at normal ambient temperatures of the annealed sheet after said sheet has become solidified, are noticeably different, as the shrinkage of commercial soda-lime glasses between the molding temperature and ambient temperatures is relatively important.

Thus, it should be understood that, in order to obtain a glass sheet having the required dimensions at normal ambient temperatures, the mold sidewalls should have, at said normal temperatures, inner dimensions which take into account the coefficient of expansion of the material of said sidewalls, whilst also taking into account the shrinkage coefficient of the glass.

With $L$ representing one of the sheet dimensions at normal ambient temperatures, $l_m$ representing the expansion of said mold length from normal temperature to the molding temperature, $l_v$ being the linear shrinkage of glass from molding temperature to normal temperatures, the dimension to be given to the mold at normal temperature is $L - l_m + l_v$. As the thickness is small relatively to the surface dimensions, the variations of thickness from molding temperature to normal temperatures are practically negligible.

For molding glass sheets according to the invention, molten glass at a temperature between 1000° C. and 1300° C. is generally used, in other words glass with a viscosity situated approximately between $10^{2.5}$ and $10^{4.5}$ poises.

The glass is preferably produced in a tank or continuous furnace. Thereafter the process can be either continuous or noncontinuous.

In the case of the noncontinuous process, the glass to be molded is withdrawn by means of suitable devices, such as ladles of given capacity, the inner surface of which is not wetted by glass.

The mold wherein the liquid molten glass is poured is usually made of graphite and generally comprises a bottom part and a frame of low height resting on it, the inner surface of the frame defining the outside profile of the glass layer once it has spread out.

The mold is heated to make the spreading of the liquid glass easier. The combustion of the mold is avoided by placing it in an enclosure wherein a nonoxidizing atmosphere is maintained.

As soon as the molten glass has finished spreading and has become of uniform thickness, the uniform layer of glass is quickly cooled, preferably by radiation, by placing a water jacket over it, until the glass sheet is in a "plastic" condition; the frame is then removed and the glass sheet is slipped onto the surface of a molten metal bath (usually molten tin) over which a nonoxidizing atmosphere (usually pure nitrogen or a mixture of hydrogen and nitrogen) is maintained.

The molten metal bath includes a heated zone wherein the glass sheet is kept for a certain time in a softened condition to eliminate from its underface, thanks to a surface tension effect, the grain of the graphite mold bottom which has been imprinted on it.

After the heating zone, the molten metal bath comprises a cooling zone wherein the glass sheet is sufficiently hardened before it is removed from the bath surface and placed on the supporting rollers of an annealing oven.

From the above description, it can be seen that the process according to the invention makes it possible to produce glass sheets of a given shape having flat and polished faces as well as rounded and polished edges while eliminating the cost of cutting it out of a ribbon and of finishing the edges.

The glass sheets so obtained have a determined minimum thickness which is closely related to the surface tension and the density of the glass.

It has been found that soda-lime glasses, which are normally used to produce window-glass and mirrors, spread out on nonwetted horizontal surfaces to an "equilibrium" thickness ranging from about 5.5 to about 6.5 millimeters; it must be noted that the usual thickness of automobile windows and of glass sheets for the mirror industry is between these limits.

It is obvious that with the process according to the invention, it is possible to mold, in a given mold, glass sheets the thickness of which is greater than the above-mentioned maximum thickness without any other consequence than a slight modification of the edge profile.

The process according to the invention is substantially simplified and of even greater interest in its semi-continuous form, wherein the molding of the sheets takes place in a mold the bottom part of which is the surface itself of a molten metal bath. It is sufficient to place on top of the bath a frame, made of graphite or any other kind of material not wetted by glass, having the required dimensions, to provide a mold for the gob which can be moved to displace the glass sheet (after molding) on the surface of the molten metal for the subsequent cooling operations.

The semi-continuous molding process can be described as follows:

A bath of molten tin is placed in an enclosure wherein a nonoxidizing atmosphere is maintained, the temperature of the bath decreasing from one end to the other. A pouring chute which is internally coated with a refractory material not wetted by glass, leads into the enclosure at the "hot end." By means of suitable dispensing means of known type, the correct amount of glass required to form a flat layer covering the whole horizontal area inside the frame to "equilibrium" thickness, is introduced at regular intervals into the enclosure through said chute. As soon as the liquid glass has roughly spread itself out, the graphite frame is moved on the surface of the bath from the initial pouring position to a so-called "final spreading" station and is replaced at the pouring station by a new frame which receives the next volume or "gob" of glass.

At the very end of the spreading period the glass layer of constant thickness located inside the frame is quickly hardened by radiation by means of a water-cooled screen which is placed close to the free surface of the new sheet. The frame containing the molded glass sheet is moved to other stations where it is maintained in a "plastic" condition until the surface condition of its faces become stabilized. Said sheet is afterwards progressively hardened, then is released from the frame before being moved into the annealing oven.

As a means to increase the rate of production, the pouring chute may pivot between two positions and periodically feed two parallel lines of molds located on the surface of a molten metal bath. Furthermore, one glass furnace can feed two pouring chutes alternately, and thus feed four lines of molds, ensuring an almost continuous flow of refined glass out of the tank.

With a tank producing 200 tons of refined glass per day, it is possible to produce, with the process according to the invention, about 50,000 glass sheets 6 millimeters thick with rounded edges and an average surface of 0.25 m.² per day.

The present invention will be better understood by referring to the annexed drawings which represent, in a purely nonlimiting and schematic manner, some of the ways of implementing the invention:

FIG. 1 shows a vertical section of the edge area of a stabilized sheet of liquid glass which has been produced by the free spreading of a body of liquid glass over a nonwetted flat horizontal surface;

FIG. 2 shows the vertical, longitudinal section of a production line for molded glass sheets, utilizing the reciprocating movement of a single movable mold;

FIG. 3 shows the vertical, longitudinal section of a semicontinuous type production line utilizing a line of molds; and FIG. 4 is a vertical section on enlarged scale of two graphite frames and their connections, each frame surrounding a molded glass sheet supported on the surface of a molten tin bath.

Referring now to FIG. 1, it should be noted that curve a, b, c is tangentially joined at a with the top face of sheet 3, whilst the merging at c with the bottom face of the sheet takes place at an angle. The slight dissymetry of curve a, b, c does not present any practical disadvantage.

On FIG. 2, it can be seen that the plant includes a compartment 7 wherein the molten glass is poured in the mold and spreads freely; a compartment 8 wherein the previously obtained uniform layer of liquid molten glass is cooled (whilst remaining in a "plastic" condition); a compartment 9 wherein the carrier is tipped up after the mold frame has been removed; a compartment 10 including an inclined graphite plate on which the glass sheet slides from the mold bottom to the molten metal bath; a compartment 11 wherein the glass sheet is kept stationary for a certain time in a softened condition while resting on the molten metal bath; and a compartment 12 wherein the glass sheet is cooled before it is transferred to the annealing oven.

When the mold is in compartments 7, 8, 9, which are separated by masonry partitions 13, the mold includes a mold bottom part 1 and a graphite frame 5 supported on carrier 14. Carrier 14, rolling on rails 15, is moved in sequence from compartment 7 to compartment 8 and to compartment 9, and is returned back to compartment 7. When mold 1 is in compartment 7, which is heated by resistors 16, a volume 17 of liquid glass is poured therein by ladle 18, said ladle having a predetermined capacity, and being internally coated with graphite, so as to obtain a complete draining off of the liquid glass therein contained. In compartment 8, the uniform layer of liquid glass formed in mold 1 is hardened by the water-cooled screen 19. In compartment 9, the frame 5 of mold 1 is raised by hooks 20 engaged in lateral recesses.

The glass sheet 3, in a plastic condition, is free to slide and after carrier 14 has been tipped up by devices not shown, to bring it to the position shown by dotted lines, it slides on to the inclined graphite plate 21 then into compartment 11, on the surface of molten tin bath 22, which is heated by resistors 23, located over bath 22, as well as by resistors 24 inside the tin bath.

In compartment 12, the glass sheet 3 is suitably cooled off before it is transported on a bent fork 25 to an annealing oven (not shown).

Various tubes 26, positioned along the above described production line feed pure nitrogen, or a mixture of nitrogen and hydrogen, to maintain a nonoxidizing atmosphere in the various compartments.

Referring now to FIG. 3, it can be seen that the molding plant essentially includes an enclosure 27, a molten tin bath 28 and a line of graphite frames 29 which are moved from one end of said enclosure to the other on the bath surface, said frames being connected one to the other by refractory yokes 30.

Four compartments are established over the molten tin bath, as follows:

(a) Compartment 31 wherein the liquid glass volume or "gob" 32 flows out from pouring chute 33 to the portion of the tin bath surface located within frame 29. Pouring chute 33, which is internally coated with graphite, is placed inside duct 34 where a nonoxidizing atmosphere is maintained. Compartment 31 is heated by resistors 35, located over the tin bath, as well as by resistors 36, inside said bath.

(b) Compartment 37 wherein the liquid glass which has been poured into the frame, completes spreading to equilibrium. At the very end of the time during which said liquid glass layer of uniform thickness stays in said compartment while resting upon the tin bath surface which forms the bottom part of the mold, said layer is hardened by a water-cooled screen 38 which is temporarily lowered from its location close to the roof of the enclosure where it is maintained most of the time.

Compartment 37 is defined by two masonry screens 39.

(c) Compartment 40, which is heated by resistors 41, wherein the surface condition of glass sheet 3 (still in a "plastic" condition) is stabilized.

(d) Compartment 42 wherein the final hardening takes place before annealing. Hook 43 is operated in said compartment for the periodical advance of the line of frames 29.

After the last yoke 30 has been removed, and after the last frame 29 and the corresponding glass sheet 3 have been transferred to the annealing oven, hook 43 is engaged in the free recess of the penultimate frame and brings it to its transfer position while, at the same time, the whole line of frames is moved along the surface of the tin bath.

Two operations, not shown on FIG. 3, complete the process:

The frames are laterally withdrawn through an opening in the furnace and the glass sheets are passed through door 44 of compartment 42 for transfer to the entrance of an annealing oven; and the frames withdrawn are returned, one after the other, to compartment 31, through door 45.

The mixture of nitrogen and hydrogen, the presence of which establishes the necessary nonoxidizing atmosphere is fed by pipes 46 located alongside the plant.

On FIG. 4, two successive frames 29, resting on the molten tin bath 28 in the cooling compartment, are shown as being connected by graphite yoke 30, the bent ends of which are inserted in recesses 47 of the sidewalls 48 of the frame.

It has been shown, on FIG. 4, that the transverse sidewalls 48 of the mold, as well as the longitudinal sides thereof, are not wetted by the tin bath 28, which forms the bottom part of the mold. Such materials are called noncapillary.

Owing to the important difference of contraction of glass and graphite, there is a small gap between the frames and the rounded edges of the glass sheets after cooling is completed. The profile of the edges is very close to the ideal profile schematically shown by curve a, b, c of FIG. 1.

The following examples illustrate various phases of the invention:

A glass having the following composition is poured into a mold composed of a graphite frame floating on a bath of molten tin:

$SiO_2$: 73.10%; $Al_2O_3$: 0.95%; $Fe_2O_3$: 0.08%; CaO: 9.20%; MgO: 3.10%; $Na_2O+K_2O$: 13.22%; $SO_3$: 0.35%.

The dimensions of the frame are of 150×45 cm.

The temperature of the glass poured is of 1150–1200° C., the temperature of the bath of molten tin being substantially the same. The glass is maintained in the "spreading zone" at this temperature for about 1 minute until it has spread to equilibrium thickness. The frame is then moved into the "hardening zone" where the glass is cooled by passing it under cold screens and over the surface of the bath of molten metal the temperature of which decreases rapidly. At the exit from this zone the temperature of the glass is of about 800° C., the temperature of the bath being substantially the same. The hardening period lasts for about 1 minute.

The frame moves then further to the zone of hardening where the temperature of the glass is gradually lowered from 700° C. to 550° C. The sheet is then released from the mold and transferred into an annealing oven.

When a borosilicate glass is used the composition of which is:

$SiO_2$: 66.7%; $B_2O_3$: 22.5%; $Al_2O_3+Fe_2O_3$: 4.50%; $Na_2O$: 6.3% the glass is poured at a temperature of 1200–1250° C. The spreading at this temperature requires about 45 sec. for a mold the dimensions of which are 63×42 cm.

As many apparently widely different embodiments of the present invention may be made without departing from the spirit and scope thereof, it is to be understood that the invention is not limited to the specific embodiments.

What is claimed is:

1. Fire polished flat glass of preselected thickness having continuous rounded, fire polished edges and flat, fire polished surfaces merging smoothly into the respective edges.

2. Flat glass of predetermined size, shape and thickness having continuous longitudinally shaped and transversely rounded edges which merge smoothly into one flat face tangentially and into the other flat face angularly.

3. Flat glass of predetermined size and shape, and of uniform thickness, having continuous longitudinally shaped and transversely rounded edges which merge smoothly into one flat face tangentially and into the other flat face at an acute angle thereto.

4. That process of producing a sheet of flat glass of predetermined size and shape and having fire polished flat surfaces and finished rounded edges, comprising, placing a continuous and bottomless mold frame having an inner surface non-capillary with respect to molten glass, onto a flat surface likewise non-capillary with respect to molten glass, depositing onto said surface and within the mold frame for confinement thereby, a volume of molten glass which will cover the area of the surface within the mold frame to a predetermined uniform depth, maintaining the glass molten until it has formed an incipient sheet of uniform thickness under the action of gravity and surface tension alone, and cooling the formed sheet.

5. A process according to claim 4 in which the said flat surface is a molten metal.

6. A process according to claim 4 in which the said flat surface is solid and of graphite.

7. The method of claim 4 said cooling of the formed sheet being continued only until the glass thereof is plastic, transferring the plastic sheet to a bath of molten metal at fire polishing, surface levelling temperature, and cooling the first polished sheet to handling temperature.

8. A process of making flat glass to its final dimensions which comprises pouring within a mold wall of material not wetted by glass onto a flat surface of material not wetted by glass, a quantity of glass which will cover the area within the wall at equilibrium, maintaining the fluidity of the glass until it has reached equilibrium and has formed a sheet, and cooling the glass, the fluid glass sheet at equilibrium being quickly cooled by radiation to a temperature at which it is still plastic, transferring the plastic glass sheet to the surface of a molten metal at fire polishing temperature, until it is fire polished, cooling the sheet while on the metal, after fire polishing, to a temperature at which its surfaces withstand handling means, and withdrawing and cooling the sheet to room temperature.

9. A process for the production of flat glass sheets of predetermined dimensions and shape, the faces of which have a fire-polished aspect and an excellent surface flatness, said sheets having rounded and polished edges, which comprises, introducing a volume of glass molten to a liquid condition on the horizontal flat bottom of a heated mold made of a material not-wetted by the glass, said volume being not inferior to the volume of a sheet of glass covering the whole surface of the mold bottom by spreading freely over it without edge contact, in said liquid condition and in said non-oxydizing atmosphere, letting said volume of molten glass in the mold spread out by the combined action of gravity and surface tension to produce a layer of uniform thickness, the rounded edges of which are in contact with the inner surface of the mold sidewalls, said sidewalls being made of a material not-wetted by liquid glass, cooling very quickly the layer of glass of uniform thickness to form a sheet of plastic glass, floating said plastic sheet of glass over the surface of a bath of molten metal to erase the sheet surface defects, cooling progressively said sheet over the surface of said bath of molten metal to a temperature at which is can be manipulated and transferring said sheet to an annealing oven.

10. The process of claim 9 wherein the layer of molten glass is formed over a part of the surface of a bath of molten material delimitated by a frame maintained at the surface of said bath and cooled to form a sheet of plastic glass, said sheet being further progressively cooled to the temperature at which it is transferred into the annealing oven while the glass is constantly supported by the bath of molten metal.

11. Apparatus for the manufacture of sheets of glass which comprises a mold made of materials non-wetted by glass composed of a frame of predetermined shape and a horizontal, flat bottom, means to introduce into said mold a predetermined volume of molten glass, means to cool the layer of glass formed within the mold to form a sheet of plastic glass, a bath of molten material, and means to move said plastic sheet of glass over the surface of said bath of molten material.

12. The apparatus of claim 11 said frame being made of graphite.

13. The apparatus of claim 11 said bottom being made of graphite.

14. The apparatus of claim 11 said bottom being the surface of a bath of molten metal.

15. The apparatus of claim 13 and means to transfer saod sheet of glass from the mold to the surface of a bath of molten metal.

16. The apparatus of claim 11 which includes means engaging the mold to move said mold over the surface of said bath.

17. Apparatus for the manufacture of flat glass sheets which includes a mold of material not wetted by molten glass and comprising a peripherally continuous frame, and a means forming a surface on which said frame may removably rest with its lower edge surface in contact therewith, means to deposit onto said surface, within the confines of said frame, a volume of molten glass to cover to a predetermined depth the area of said surface enclosed by said frame, and means to maintain the temperature of said glass elevated until said glass has spread to uniform depth over said area, by gravity and surface tension alone and with its edges in contact with said frame.

18. The method of making a sheet of flat glass which comprises feeding into a non-wettable mold having upstanding walls, molten glass of a sufficient quantity and temperature to form, by gravity and surface tension, alone, a sheet the size and shape of the mold, and maintaining the temperature of the glass elevated until the sheet is of uniform thickness, with its edges in linear contact with the upstanding walls of the mold.

19. The method of claim 18 which further includes quickly cooling the sheet to handling temperature.

20. The method of claim 18, cooling the sheet of plasticity and transferring the sheet to a bath of molten metal for fire polishing thereby.

21. The method of claim 18 wherein the incipient sheet is fed directly onto a molten metal bath.

22. Apparatus for the manufacture of sheets of glass which comprises a mold made of materials non-wetted by glass composed of a frame of predetermined shape, means to introduce into said mold a predetermined volume of molten glass, means to cool the layer of glass formed within the mold to form a sheet of plastic glass, a bath of molten metal, and means to move said plastic sheet of glass over and in direct contact with the surface of said bath of molten metal.

23. The apparatus of claim 22 in which said frame has a solid bottom of graphite.

24. The apparatus of claim 22 in which the bottom of said mold is the surface of said bath of molten metal.

References Cited

UNITED STATES PATENTS

| 276,924 | 5/1883 | Swan | 65—26 |
|---|---|---|---|
| 1,670,110 | 5/1928 | Fraser | 65—93 |
| 1,812,565 | 6/1931 | Sloan | 65—72 |
| 2,911,759 | 11/1959 | Pilkington et al. | 65—32 XR |

FOREIGN PATENTS 1,336,367  7/1963  France.

DONALL H. SYLVESTER, *Primary Examiner.*

R. L. LINDSAY, *Assistant Examiner.*